US012059800B2

(12) United States Patent
Williamson et al.

(10) Patent No.: US 12,059,800 B2
(45) Date of Patent: Aug. 13, 2024

(54) END EFFECTORS FOR ROBOTIC UNITS USED TO OPEN AND CLOSE VEHICLE DOORS

(71) Applicant: Nissan North America, Inc., Franklin, TN (US)

(72) Inventors: Andrew Williamson, Smyrna, TN (US); Mario Bocanegra, Murfreesboro, TN (US); Aaron Butler, Lebanon, TN (US); Glen Dodson, Murfreesboro, TN (US)

(73) Assignee: Nissan North America, Inc., Franklin, TN (US)

( * ) Notice: Subject to any disclaimer, the term of this patent is extended or adjusted under 35 U.S.C. 154(b) by 1262 days.

(21) Appl. No.: 16/674,163

(22) Filed: Nov. 5, 2019

(65) Prior Publication Data

US 2021/0129351 A1 May 6, 2021

(51) Int. Cl.
*B25J 15/00* (2006.01)
*B25J 19/00* (2006.01)
(Continued)

(52) U.S. Cl.
CPC ....... *B25J 15/0047* (2013.01); *B25J 19/0025* (2013.01); *B25J 19/025* (2013.01);
(Continued)

(58) Field of Classification Search
CPC .......... B25J 15/0047; B25J 11/0075; B25J 19/0025; B25J 19/025; B62D 65/06;
(Continued)

(56) References Cited

U.S. PATENT DOCUMENTS 3,178,040 A 4/1965 Nelson
3,709,190 A * 1/1973 Von Gottberg ..... B05B 13/0452
901/17
(Continued)

FOREIGN PATENT DOCUMENTS

DE 10121344 A1 * 11/2002 ........... B25B 11/007
DE 202011052434 U1 3/2013
(Continued)

OTHER PUBLICATIONS

DE-10121344-A1 translation (Year: 2002).*
WO-8606313-A translation (Year: 1986).*

*Primary Examiner* — Abbie E Quann
(74) *Attorney, Agent, or Firm* — Young Basile Hanlon & MacFarlane, P.C.

(57) ABSTRACT

An end effector is disclosed that is configured for connection to a robotic unit used to manipulate a door of a vehicle (e.g., during vehicle painting). The end effector includes a base plate; a sensor that is supported by the base plate; and a piston that is configured for engagement with the door. The piston is operatively connected to an interrupter such that movement (displacement) of the piston causes corresponding movement (displacement) of the interrupter between a first position, in which the interrupter is positioned in alignment with a signal transmitted across the sensor to interfere with the signal and thereby interrupt circuit completion, and a second position, in which the interrupter is out of alignment with the signal transmitted across the sensor to permit circuit completion and thereby inform the robotic unit that the door is present and engaged with the end effector.

20 Claims, 8 Drawing Sheets

(51) Int. Cl.
*B25J 19/02* (2006.01)
*B62D 65/02* (2006.01)
*B62D 65/06* (2006.01)
*B25J 11/00* (2006.01)

(52) U.S. Cl.
CPC .......... *B62D 65/024* (2013.01); *B62D 65/06* (2013.01); *B25J 11/0075* (2013.01)

(58) Field of Classification Search
CPC .............. B62D 65/024; B05B 13/0452; B05B 13/0292; B05B 13/0431; B05B 13/04
USPC ......................................................... 269/47
See application file for complete search history.

(56) References Cited

U.S. PATENT DOCUMENTS

| | | |
|---|---|---|
| 4,342,536 A | 8/1982 | Akeel et al. |
| 4,423,999 A | 1/1984 | Choly |
| 4,498,414 A | 2/1985 | Kiba et al. |
| 4,540,331 A | 9/1985 | Stanner et al. |
| 4,546,724 A | 10/1985 | Kiryu et al. |
| 4,721,630 A | 1/1988 | Takeo et al. |
| 4,743,159 A | 5/1988 | Inamori |
| 4,988,260 A | 1/1991 | Kiba et al. |
| 5,014,644 A | 5/1991 | Yamamoto et al. |
| 5,050,919 A | 9/1991 | Yakou |
| 5,201,838 A | 4/1993 | Roudaut |
| 5,941,679 A | 8/1999 | Foti et al. |
| 6,338,441 B1 | 1/2002 | Umezawa et al. |
| 6,361,095 B1 | 3/2002 | Attee |
| 7,263,781 B2 | 9/2007 | Sielemann |
| 8,919,844 B1 | 12/2014 | Mascorro et al. |
| 2009/0204260 A1 | 8/2009 | Bryne et al. |
| 2012/0118136 A1 | 5/2012 | Heerdt et al. |
| 2013/0034660 A1 | 2/2013 | Koyanagi et al. |

FOREIGN PATENT DOCUMENTS

| | | | |
|---|---|---|---|
| EP | 2197593 B1 | 1/2016 | |
| WO | WO-8606313 A | * 11/1986 | .............. B25J 17/02 |
| WO | 2010014674 A1 | 2/2010 | |
| WO | 2016087042 A1 | 6/2016 | |

* cited by examiner

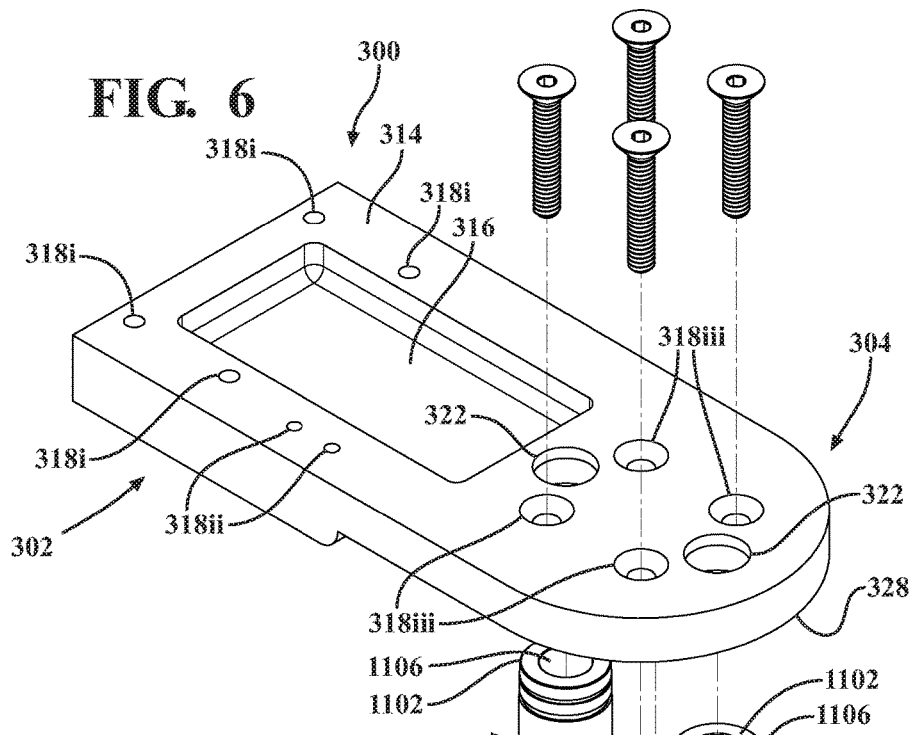
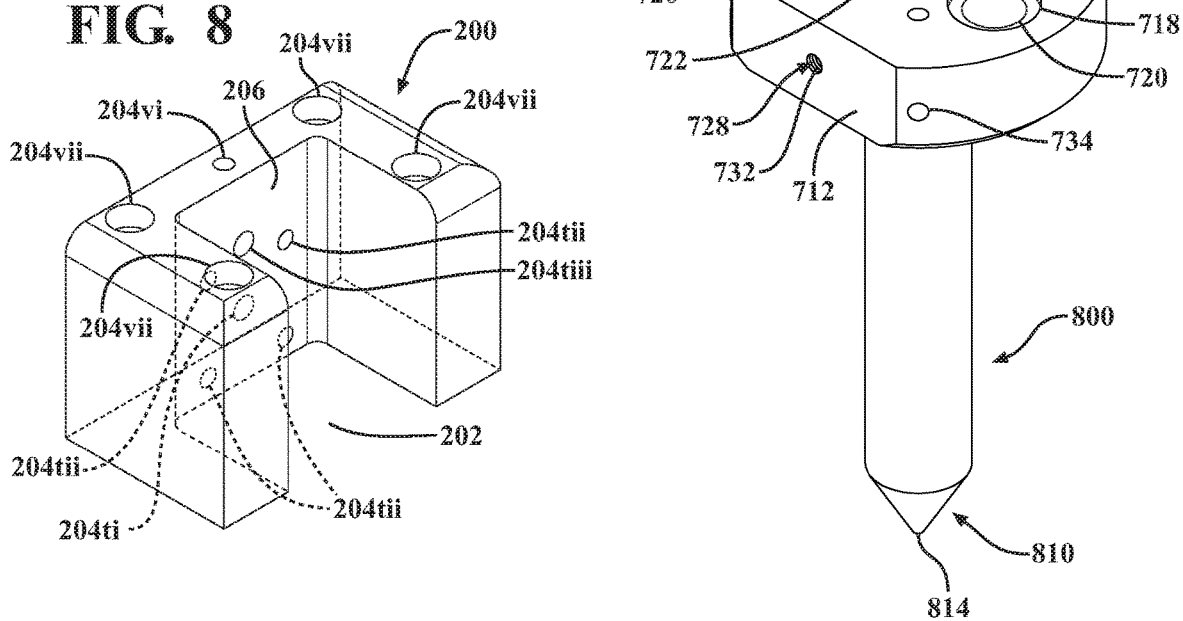

END EFFECTORS FOR ROBOTIC UNITS USED TO OPEN AND CLOSE VEHICLE DOORS

TECHNICAL FIELD

The present disclosure relates to vehicle painting. More specifically, the present disclosure relates to end effectors for robotic units used to open and close vehicle doors during vehicle painting.

BACKGROUND

Many vehicle manufacturers employ robotic units during vehicle painting to not only open and close the doors of the vehicles, but to apply paint to the vehicles. Typically, one robotic unit is used to open and close the doors of the vehicles and another robotic unit is used for paint application. Usually, opening and closure of the doors is accomplished by inserting a tool (e.g., a pin, a paddle, a gripper, etc.) into the window channels in the doors or via other such comparable engagement. Before the doors are opened, however, the robotic units typically require confirmation that the vehicle door is not only present, but sufficiently engaged by the robotic unit, absent which, movement and operation of the robotic unit will cease.

The tools associated with known robotic units have several drawbacks. For example, known tools are often large, which creates an obstacle that may impede paint application as well as difficulties regarding insertion, removal, and operation, particularly in the context of smaller vehicles and/or vehicles with curved windows. Additionally, known tools often present programming challenges resulting from issues concerning vehicle door detection and confirmation of positive engagement with the vehicle door, and create a potential for loss of vehicle door detection and/or engagement (e.g., due to sudden conveyor stops that may release the necessary tension on the robotic unit required to maintain detection and/or engagement).

The present disclosure addresses these shortcomings by providing improved end effectors for robotic units used in connection with vehicle painting.

SUMMARY

In one aspect of the present disclosure, an end effector is disclosed that is configured for connection to a robotic unit used to manipulate a door of a vehicle (e.g., during vehicle painting). The end effector includes a base plate; a sensor that is supported by the base plate; and a piston that is configured for engagement with the door. The piston is operatively connected to an interrupter such that movement (displacement) of the piston causes corresponding movement (displacement) of the interrupter between a first position, in which the interrupter is aligned with a signal transmitted across the sensor to interfere with the signal and thereby interrupt circuit completion, and a second position, in which the interrupter is out of alignment with the signal transmitted across the sensor to permit circuit completion and thereby inform the robotic unit that the door is present and engaged with the end effector.

In certain embodiments, the end effector may include a non-electrostatic material.

In certain embodiments, the end effector may be configured for connection to fiber optic transmission media such that the signal transmitted across the sensor is a fiber optic signal.

In certain embodiments, the piston may be indirectly connected to the interrupter.

In certain embodiments, the end effector may further include a biasing member that is configured to bias the interrupter towards the first position.

In certain embodiments, the piston may be configured for movement (displacement) along an axis that extends in generally orthogonal relation to the signal transmitted across the sensor.

In certain embodiments, the piston may be configured for linear, vertical movement (displacement) between the first position and the second position.

In certain embodiments, the end effector may further include a dowel that is configured for insertion into a window channel of the door.

In certain embodiments, the dowel may extend through the piston such that the dowel extends beyond a contact surface defined by the piston that is configured for contact with the door.

In certain embodiments, the piston may define a sleeve that is configured to receive the dowel such that the sleeve circumscribes the dowel.

In certain embodiments, the piston may include an outer wall defining an arc that spans approximately 90° to allow for relative rotation between the dowel and the door while maintaining engagement between the dowel and the door.

In certain embodiments, the end effector may further include a dowel mount that is configured to secure the dowel in relation to the base plate.

In certain embodiments, the end effector may further include a bearing that is received by the dowel mount.

In certain embodiments, the bearing may be configured to support movement (displacement) of the piston as the interrupter moves between the first position and the second position.

In another aspect of the present disclosure, an end effector is disclosed that is configured for connection to a robotic unit used to manipulate a door of a vehicle. The end effector includes a fixed member that is configured for insertion into a window channel defined by the door, and a movable member that is configured for contact with the door. The movable member is positioned about the fixed member such that the end effector is reconfigurable between a passive configuration, in which signal transmission across the end effector is obstructed to prevent circuit completion, and an active configuration, in which signal transmission across the end effector is unobstructed to allow for circuit completion to thereby inform the robotic unit that the door is present and engaged with the end effector.

In certain embodiments, the movable member may be operatively connected to an interrupter such that reconfiguration of the end effector causes corresponding repositioning of the interrupter.

In certain embodiments, the interrupter may be aligned with a fiber optic beam transmitted across the end effector when the end effector is in the passive configuration and misaligned with the fiber optic beam when the end effector is in the active configuration.

In certain embodiments, the end effector may be biased towards the passive configuration.

In certain embodiments, the movable member may be configured for movement (displacement) along an axis that extends in generally orthogonal relation to the fiber optic beam.

In certain embodiments, the movable member may define a sleeve that is configured to receive the fixed member such that the sleeve circumscribes the fixed member.

In certain embodiments, the movable member may include an outer wall defining an arc that spans approximately 90° to allow for relative rotation between the fixed member and the door while maintaining engagement between the fixed member and the door.

In another aspect of the present disclosure, a method is disclosed for detecting the presence of a vehicle door and engagement between the vehicle door and an end effector of a door-opening robotic unit. The method includes inserting a dowel of the end effector into a window channel of the vehicle door and displacing a piston relative to the dowel via contact with the vehicle door to cause corresponding displacement (movement) of an interrupter that is operatively connected to the piston to allow for the completion of a circuit to thereby inform the door-opening robotic unit that the vehicle door is present and engaged by the end effector.

In certain embodiments, displacement of the interrupter may include moving the interrupter out of alignment with a signal transmitted across a sensor of the end effector.

In certain embodiments, the method may further include transmitting a fiber optic beam across the sensor.

In certain embodiments, the interrupter may be aligned with the fiber optic beam prior to displacement (movement) of the piston and the interrupter such that the interrupter obstructs the fiber optic beam and thereby prevents completion of the circuit.

BRIEF DESCRIPTION OF THE DRAWINGS

According to common practice, the various features of the drawings may not be to scale, and may be arbitrarily expanded or reduced for clarity.

FIG. 6 is a partial, top, perspective view of the end effector with parts separated.

FIG. 8 is a top, perspective view of a wrist bracket of the end effector.

DETAILED DESCRIPTION

The present disclosure describes various embodiments and implementations of robotic systems used in connection with the application of paint to vehicles. The systems described herein include a door-opening robotic unit with an end effector that is configured to engage and open the doors of a vehicle to facilitate the application of paint to the vehicle (e.g., to the interior of the vehicle) by an additional robotic unit. The end effector includes a dowel that is configured for insertion into the window channels of the doors to allow for positive engagement of, and control over, the doors by the robotic unit via the end effector. Prior to movement of the doors, however, confirmation must be provided to the robotic unit that the doors are not only present, but positively engaged by the end effector. To this end, the end effector includes a movable piston that is displaced during insertion of the dowel into the window channel. Displacement (movement) of the piston causes corresponding displacement (movement) of an interrupter to allow for the completion of a circuit (e.g., a fiber optic circuit), which provides the robotic unit with the requisite confirmation.

Compared to known technologies, the robotic systems, units, and end effectors described herein offer reductions in size and weight as well as improved paint drip performance. Additionally, the robotic systems, units, and end effectors described herein offer a reduced risk of marring wet paint on vehicle doors, improved flexibility in programming of the robotic units by allowing for vehicle door detection and confirmation of positive engagement independent of the angle of the robotic unit, and universal interchangeability. More specifically, the end effectors described herein are configured for use with any door on the vehicle, regardless of whether the door is a front or rear door and regardless of whether the door is located on the driver side or the passenger side of the vehicle, thereby eliminating the need for a variety of end effectors or end effectors capable of reconfiguration. Additionally, the end effectors described herein allow for increases in throughput by reducing (if not entirely eliminating) faults associated with false indications of detection and/or engagement.

Figure 1:
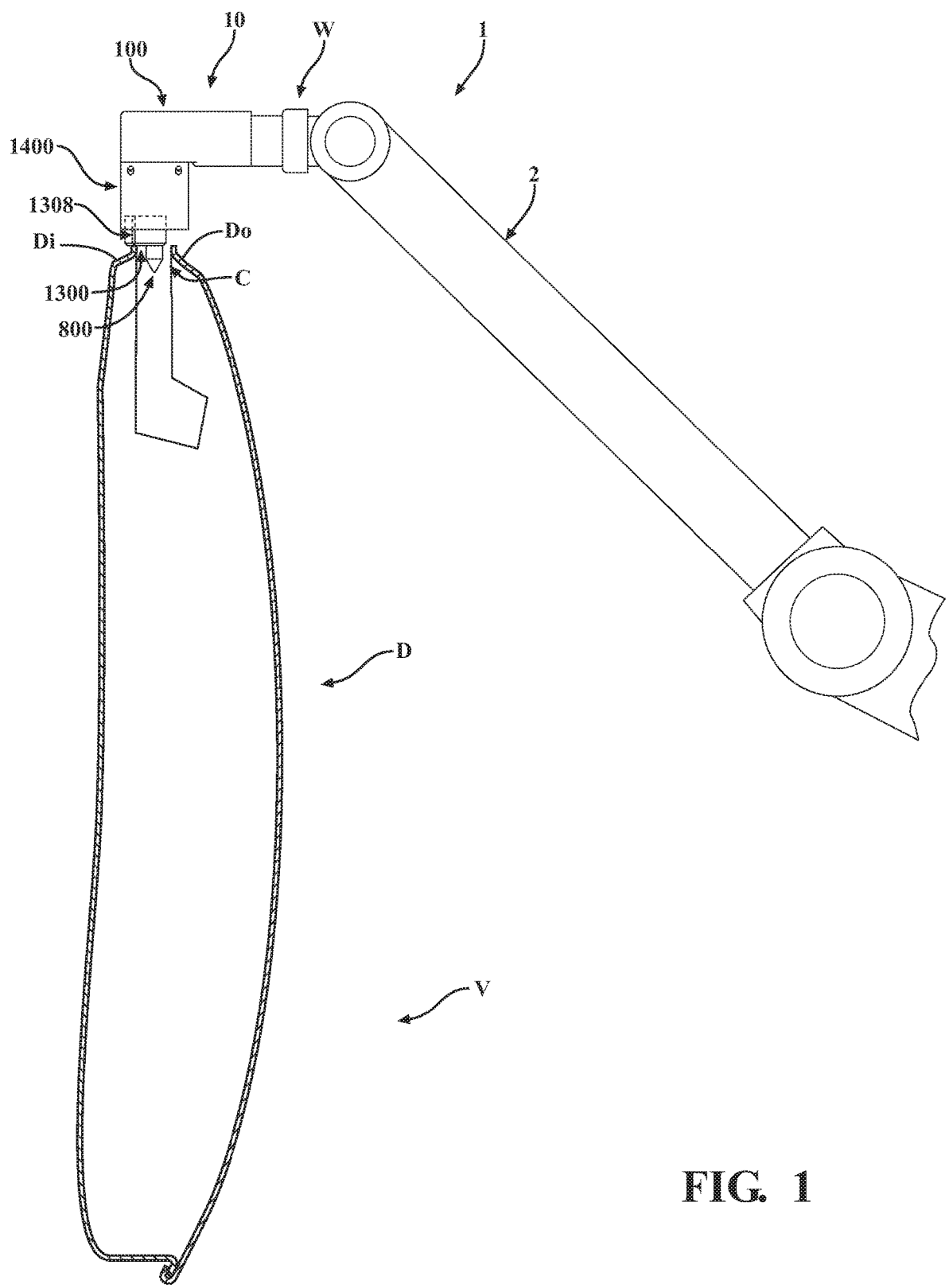
FIG. 1 is a side, plan view of a robotic unit for use in conneciton with the application of paint to a vehicle and including an end effector shown engaged with a vehicle door.
Figure 2:
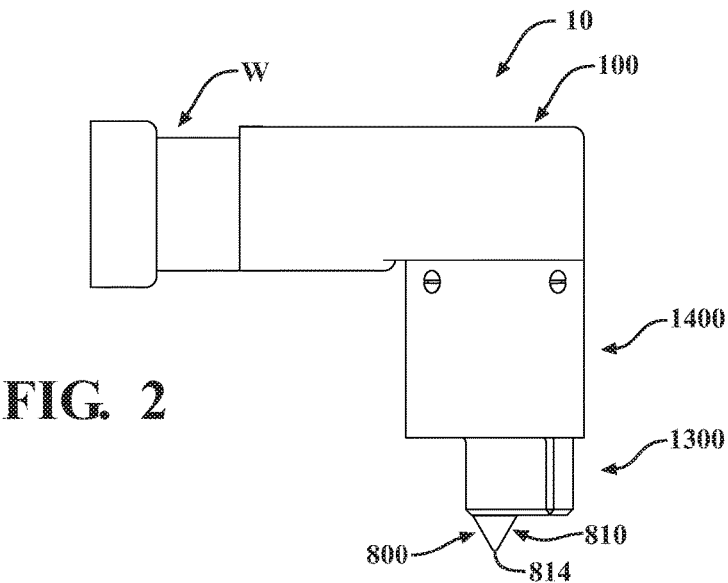
FIG. 2 is a side, plan view of the end effector.

With reference to FIG. 1, a robotic unit 1 is illustrated for use in connection with the application of paint to a vehicle V. The robotic unit 1 includes an end effector 10, which is the subject of the present disclosure, that is configured to individually engage and manipulate (e.g., open and close) doors D of the vehicle to facilitate the application of paint to the vehicle V (e.g., to interior portions of the vehicle V) by an additional robotic unit (not shown) per industry convention. More specifically, as described in further detail below, the end effector 10 is configured for engagement with a window channel C in each door D that is defined by, and which extends between, respective inner and outer surfaces Di, Do of the door D. So as not to interfere with the application of paint to vehicles, it is envisioned that certain components of the end effector 10 (e.g., external components) may include (e.g., may be formed partially or entirely from) one or more non-electrostatic materials, such as, for example, polylactic acid plastic (PLA), whereas certain components of the end effector 10 (e.g., internal components) may include (e.g., may be formed partially or entirely from) one or more metallic materials (e.g., aluminum, steel, etc.).

Referring to FIGS. 2-14 as well, the end effector 10 will be discussed in detail. Throughout the following discussion, the term "proximal" should be understood as referring to that end or portion of a component that is closest to the robotic unit 1 (FIG. 1), whereas the term "distal" should be understood as referring to that end or portion of a component that is furthest from the robotic unit 1. Additionally, the use of terms such as "operatively connected," "operatively engaged," and the like should be understood to encompass any manner of connection between components, whether direct or indirect, that supports the intended functionality of the components.

The end effector 10 is configured for releasable connection to the robotic unit 1 (FIG. 1) and provides for increased vertical spacing between the surfaces on the vehicle door D contacted by the end effector 10 (e.g., the inner surface Di adjacent to the window channel C) and an arm 2 of the robotic unit 1. The end effector 10 is resiliently reconfigurable between a passive (first) configuration (FIGS. 2, 3A) and an active (second) configuration (FIG. 3B) during engagement with and disengagement from the door D. As described in detail below, the end effector 10 includes a proximal (upper) cover 100; a wrist bracket 200; a base plate 300; a sensor bracket 400 supporting a sensor 500; an interrupter 600; a dowel mount 700; a dowel 800; one or more piston shafts 900; one or more biasing members 1000; one or more bearings 1100; a piston mount 1200; a piston 1300; and a distal (lower) cover 1400.

The proximal cover 100 is configured to conceal and/or protect various components of the end effector 10 (e.g., the wrist bracket 200; the base plate 300; the sensor bracket 400; the sensor 500; the interrupter 600; etc.), as well as the various fasteners used to connect the components, so as to inhibit (if not entirely prevent) damage, paint overspray, and/or the intrusion of dust, debris, etc. In the particular embodiment of the disclosure seen throughout the figures, the proximal cover 100 includes (e.g., is formed partially or entirely from) a non-electrostatic material, such as, for example, polylactic acid plastic (PLA), so as not to interfere with the application of paint to the vehicle V and is formed via a 3-D printing process. It should be appreciated, however, that the proximal cover 100 may include any material (or combination of materials) suitable for the intended purposes described above and may be formed through any suitable method of manufacture.

As seen in FIGS. 1-3B, for example, the proximal cover 100 includes radiused edges and corner sections, which facilitates and promotes enveloping of the proximal cover 100 by a paint-absorbent wrap (not shown) during painting so as to inhibit (if not entirely prevent) paint from contacting the end effector 10 during application to the vehicle V.

The wrist bracket 200 is configured to facilitate connection of the end effector 10 to the robotic unit 1 via a wrist W that supports a connector block (bulkhead) (not shown) so as to establish pneumatic as well as fiber optic and/or electrical connectivity between the end effector 10 and the robotic unit 1.

In the particular embodiment of the disclosure seen throughout the figures, the wrist bracket 200 includes (e.g., is formed partially or entirely from) a non-electrostatic material, such as, for example, polylactic acid plastic (PLA), so as not to interfere with the application of paint to the vehicle V. It should be appreciated, however, that the wrist bracket 200 may include any material (or combination of materials) suitable for the intended purpose of facilitating connection of the end effector 10 to the robotic unit 1 via the wrist W and that the wrist bracket 200 may be formed through any suitable method of manufacture (e.g., 3-D printing, machining, casting, etc.).

The wrist bracket 200 is generally U-shaped in configuration and defines a vertical channel 202 (FIG. 8) that not only reduces the overall weight of the wrist bracket 200 but provides a working space to facilitate assembly and disassembly of the end effector 10 (e.g., connection and disconnection of the sensor 500 and the sensor bracket 400, connection of the sensor 500 to a fiber optic source (not shown), etc.). The wrist bracket 200 includes a plurality of vertical apertures 204$v$ (FIG. 8) that are configured and dimensioned to receive corresponding fasteners (e.g., screws) to facilitate (removable) connection of the proximal cover 100 to the wrist bracket 200 and connection of the wrist bracket 200 to the base plate 300 as well as a series of transverse apertures 204$t$ that are formed in a rear wall 206. More specifically, the wrist bracket 200 includes one or more apertures 204$vi$ that are configured to received one or more fasteners 208$i$ (FIGS. 3A, 3B, 7) to removably connect the proximal cover 100 to the wrist bracket 200; a series of apertures 204$vii$ that are configured to receive fasteners 208$ii$ to removably connect the wrist bracket 200 to the base plate 300; an aperture 204$ti$ that is configured to receive transmission media T (FIG. 7) (e.g., one or more fiber optic and/or electrical cables), pneumatic lines, etc., to support movement and operation of the end effector 10 in the manner described hereinbelow; and a series of apertures 204$tii$ that are configured to receive fasteners (e.g., screws) (not shown) to facilitate (removable) connection of the wrist W to the wrist bracket 200. Although the wrist bracket 200 is shown as including a single aperture 204$vi$, a single fastener 208$i$, four apertures 204$vii$, and four fasteners 208$ii$ in the illustrated, it should be appreciated that the particular number (and/or location) of the apertures 204 and the fasteners 208 may be varied in alternate embodiments without departing from the scope of the present disclosure. Additionally, although the wrist bracket 200 is shown as including apertures 204$tii$ that are arranged in a generally square-shaped pattern in the illustrated embodiment (e.g., to facilitate connection to a particular wrist W and a particular robotic unit 1), it is envisioned that the number and/or orientation of the apertures 204$tii$ may be varied in alternate embodiments of the disclosure to facilitate use with any wrist W and any robotic unit 1.

In the illustrated embodiment, the wrist bracket 200 further includes an aperture 204$tiii$ that is configured to receive an airline (not shown) to facilitate internal pressurization of the end effector 10 (e.g., to maintain cleanliness, remove debris, etc.). It should be appreciated, however, that the aperture 204$tiii$ may be eliminated in alternate embodiments without departing from the scope of the present disclosure.

The base plate 300 (FIGS. 2-7, 9) supports the various components of the end effector 10, either directly or indirectly, and includes (e.g., is formed partially or entirely from) a non-electrostatic material, such as, for example, polylactic acid plastic (PLA), so as not to interfere with the application of paint to the vehicle V. It should be appreciated, however, that the base plate 300 may include any suitable material (or combination of materials) and that the base plate 300 may be formed through any suitable method of manufacture (e.g., 3-D printing, machining, casting, etc.).

The base plate 300 includes a first end portion 302 (FIGS. 6, 9) having a generally rectangular longitudinal (horizontal) cross-sectional configuration and a second end portion 304 that extends from the first end portion 302. The second end portion 304 has a generally arcuate (e.g., semi-circular)

longitudinal (horizontal) cross-sectional configuration. Although shown as being unitary (e.g., monolithic) in construction throughout the figures, embodiments in which the base plate 300 may include a series of discrete components would not be beyond the scope of the present disclosure.

Figure 9:
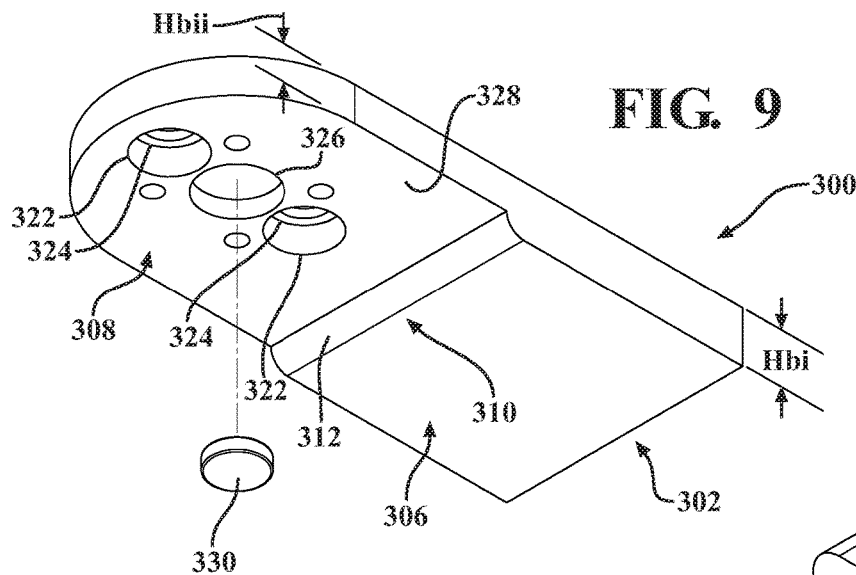
FIG. 9 is a bottom, perspective view of a base plate of the end effector.

As seen in FIG. 9, for example, the base plate 300 includes a variable transverse (vertical) dimension (height) Hb (e.g., to reduce the space occupied by the base plate 300 and the overall weight thereof), which creates sufficient stroke length for the end effector 10 (i.e., vertical travel of the piston 1300, as described in further detail below) while reducing the overall space occupied by the base plate 300. More specifically, the base plate 300 includes a first region 306 defining a first height Hbi and a second region 308 defining a second height Hbii that is less than the first height Hbi. The respective first and second regions 306, 308 are separated by a transition 310 that includes a radiused edge 312, which reduces the presence of corners, thus simplifying cleaning of the end effector 10 as well as assembly and disassembly (e.g., during maintenance and/or part replacement).

In the specific embodiment of the base plate 300 seen throughout the figures, the transition 310 is illustrated as being located within the first end portion 302. Embodiments are envisioned, however, in which the particular location of the transition 310 may be varied (e.g., such that the transition 310 is located closer to (or further from) the second end portion 304), as are embodiments that are devoid of the transition 310 in which the base plate 300 defines a uniform height Hb.

The base plate 300 includes a proximal (upper) surface 314 defining a pocket (or other such recess) 316. Although shown as being generally rectangular in the embodiment seen throughout the figures, it is envisioned that the particular configuration of the pocket 316 may be varied without departing from the scope of the present disclosure. The proximal surface 314 of the base plate 300 includes a first series of apertures 318*i* (FIG. 6) that are configured to receive the fasteners 208*ii* (FIGS. 3A, 3B, 7) extending through the wrist bracket 200 to thereby connect the wrist bracket 200 to the base plate 300 as well as one or more additional apertures 318*ii* (FIGS. 4, 6) that are configured to receive fasteners 320*ii* (e.g., screws) to thereby (removably) connect the sensor bracket 400 to the base plate 300, as described in further detail below. The base plate 300 further includes a series of apertures 318*iii* (FIG. 6) extending through the base plate 300 (e.g., in the second region 308) that are configured to receive fasteners 320*iii* (e.g., screws) to thereby (removably) connect the base plate 300 to the dowel mount 700, as well as one or more openings 322 that are configured to receive the bearing(s) 1100 and, thus, the piston shaft(s) 900, to allow for vertical movement (displacement) of the piston shaft(s) 900 relative to (and through) the base plate 300 during use of the end effector 10, as described in further detail below. To facilitate secured reception of the bearing(s) 1100 by the base plate 300, and prevent the bearing(s) 1100 from exiting the base plate 300 through the proximal surface 314 thereof, the opening(s) 322 may include an inwardly extending projection (shoulder) 324 (FIG. 9) that is configured for contact (engagement) with proximal (upper) end(s) 1102 of the bearing(s) 1100.

In certain embodiments of the disclosure, such as that seen throughout the figures, the base plate 300 further includes a receptacle 326 (FIG. 9) formed in a distal (lower) surface 328 thereof. The receptacle 326 is configured to receive a magnet 330 and extends partially through the base plate 300 (towards the proximal surface 314). The magnet 330 is configured for contact with the dowel 800 to increase the retention force when the end effector 10 is in the passive configuration (e.g., prior to engagement with the door D of the vehicle V) to reduce (if not entirely eliminate) inadvertent movement of the piston 1300 and, thus, the likelihood that the end effector 10 may falsely identify positive engagement with the door D.

Although shown as being generally circular in the embodiment seen throughout the figures, it is envisioned that the particular configurations of the receptacle 326 and the magnet 330 may be varied without departing from the scope of the present disclosure.

Figure 4:
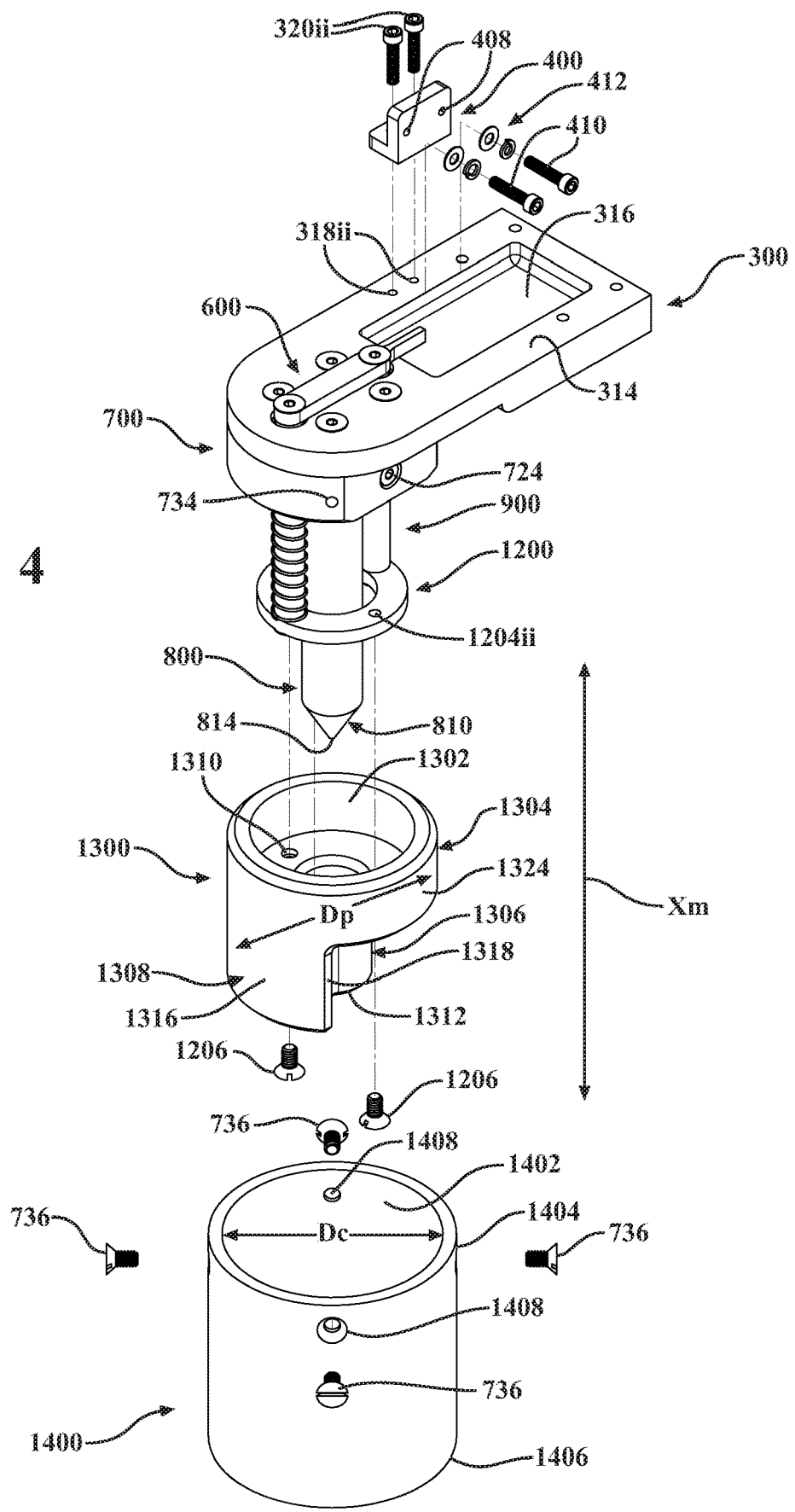
FIG. 4 is a partial, top, perspective view of the end effector with parts separated.
Figure 7:
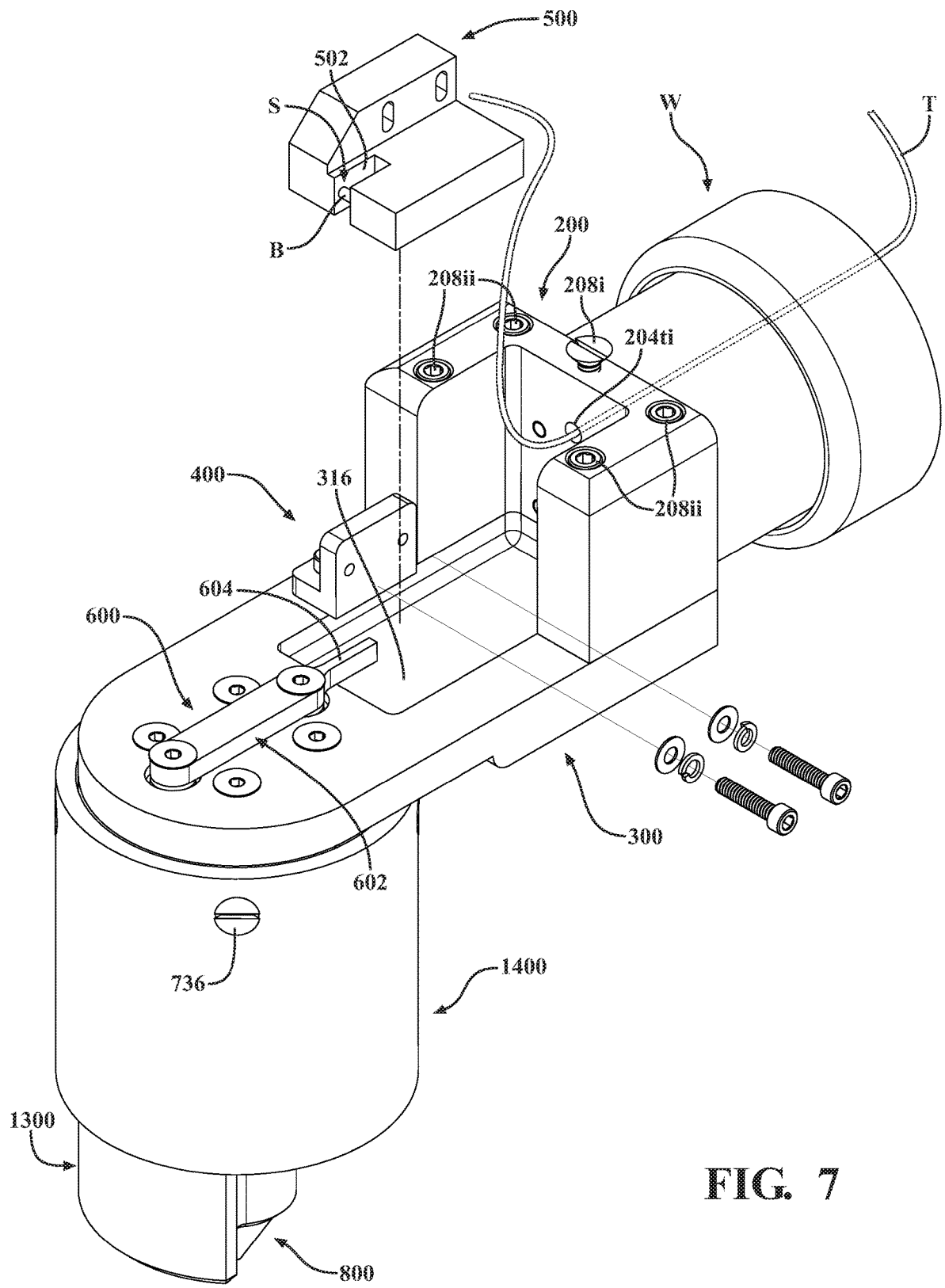
FIG. 7 is a partial, side, perspective view of the end effector with a sensor shown separated from a sensor bracket.
Figure 10:
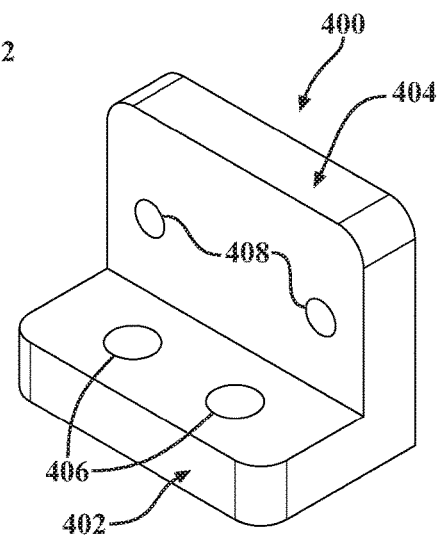
FIG. 10 is a top, perspective view of the sensor bracket seen in FIG. 7.

With reference now to FIGS. 4, 7, and 10, the sensor bracket 400 and the sensor 500, each of which is supported by the base plate 300, will be discussed. The sensor bracket 400 is configured to support the sensor 500 and, in the illustrated embodiment, includes (e.g., is formed partially or entirely from) polylactic acid plastic (PLA). It should be appreciated, however, that the sensor bracket 400 may include (e.g., may be formed partially or entirely from) any suitable non-electrostatic material (or combination of materials) so as not to interfere with the application of paint to the vehicle V and that the sensor bracket 400 may be formed through any suitable method of manufacture (e.g., 3-D printing, machining, casting, etc.). Although shown as being unitary (e.g., monolithic) in construction throughout the figures, embodiments in which the sensor bracket 400 may include discrete components would not be beyond the scope of the present disclosure.

The sensor bracket 400 is secured to the base plate 300 adjacent to the wrist bracket 200. In certain embodiments, such as that seen throughout the figures, the sensor bracket 400 may be configured to overhang the pocket 316 in the base plate 300 (as seen in FIG. 7, for example) such that a portion of the sensor bracket 400 extends into and above the pocket 316, as elaborated upon below.

The sensor bracket 400 is generally L-shaped in configuration and includes respective first and second legs 402, 404 (FIG. 10) that extend in generally orthogonal relation. The first leg 402 includes one or more apertures 406 that are configured to receive the fasteners 320*ii* (FIG. 4) such that the fasteners 320*ii* extend through the first leg 402 of the sensor bracket 400 into the apertures 318*ii* in the base plate 300 to thereby secure the sensor bracket 400 to the base plate 300. The second leg 404 includes one or more apertures 408 (FIGS. 4, 10) that are configured to receive fasteners 410 (e.g., screws) (FIGS. 3A, 4) such that the fasteners 410 extend through the sensor 500 to thereby (removably) secure the sensor 500 to the sensor bracket 400 and, thus, fix the sensor 500 in relation to the base plate 300. To further secure the sensor 500 in relation to the sensor bracket 400, it is envisioned that one or more retainers 412 (e.g., washers, clips, etc.) (FIG. 4) may be utilized.

The sensor 500 is configured to communicate, generate, or otherwise transmit a signal S that provides confirmation to the robotic unit 1 that the door D is present and engaged by the end effector 10. More specifically, the sensor 500 is configured for connection to the transmission media T so as to communicate, generate, or otherwise transmit a beam B across a gap 502 defined by the sensor 500 in generally orthogonal relation to the direction of extension of the transmission media T through the wrist bracket 200 and the wrist W. In the specific embodiment of the disclosure seen throughout the figures, for example, the transmission media T and the sensor 500 are configured for connection to a fiber optic source (not shown) such that the sensor 500 communicates, generates, or otherwise transmits a fiber optic signal S to the robotic unit 1 during use.

As indicated above, the sensor bracket 400 and, thus, the sensor 500, may overhang the pocket 316 in the base plate 300 such that the pocket 316 is positioned beneath the sensor 500. The rectangular, elongate configuration of the pocket 316 in the base plate 300 not only provides operating space that facilitates access to and/or manipulation of the sensor 500, but facilitates connection and disconnection of the base plate 300, the sensor bracket 400, and the sensor 500 as well as the receipt (or other such accommodation) of the transmission media T and proper relative orientation of the sensor 500 and the interrupter 600, as discussed in further detail below.

The interrupter 600 is supported by the base plate 300 such that the interrupter 600 is movable between a first (normal) position (FIG. 3A) and a second (displaced) position (FIG. 3B) as the end effector 10 transitions between the passive configuration and the active configuration. In the first position, the interrupter 600 extends into the gap 502 defined by the sensor 500 and is aligned with the signal S so as to obstruct, block, or otherwise interfere with the signal S, thereby interrupting circuit completion so as to inform the robotic unit 1 that the door D has not been engaged by the end effector 10. In the second position, the interrupter 600 is displaced from (e.g., positioned above) the gap 502 and is positioned out of alignment with the signal S, thereby permitting unobstructed communication of the signal S across the sensor 500 and the completion of a circuit so as to confirm the presence of the door D and engagement of the door D by the end effector 10 for the robotic unit 1.

The interrupter 600 may include (e.g., may be formed partially or entirely from) any material (or combination of materials) suitable for the intended purpose of interrupting the signal S and may be formed through any suitable method of manufacture (e.g., 3-D printing, machining, casting, etc.). In the embodiment seen throughout the figures, for example, the interrupter 600 includes (e.g., is formed partially or entirely from) carbon steel. It should be appreciated, however, that other materials of construction may be utilized without departing from the scope of the present disclosure.

The interrupter 600 includes a body portion 602 (FIGS. 5, 7) and a flag 604 that extends from the body portion 602 towards the sensor 500. The body portion 602 defines one or more apertures 606, each of which is configured to receive a fastener 608 (e.g., a screw) so as to (removably) secure the interrupter 600 to the piston shaft(s) 900 such that movement (displacement) of the piston shaft(s) 900 causes corresponding movement (displacement) of the interrupter 600. The flag 604 is configured for receipt within the gap 502 defined by the sensor 500 such that the flag 604 moves into and out of the gap 502 during movement (displacement) of the interrupter 600 between the first and second positions to allow for interruption and completion of the circuit in correspondence with engagement and disengagement of the end effector 10 and the door D, as described in further detail below.

Figure 13:
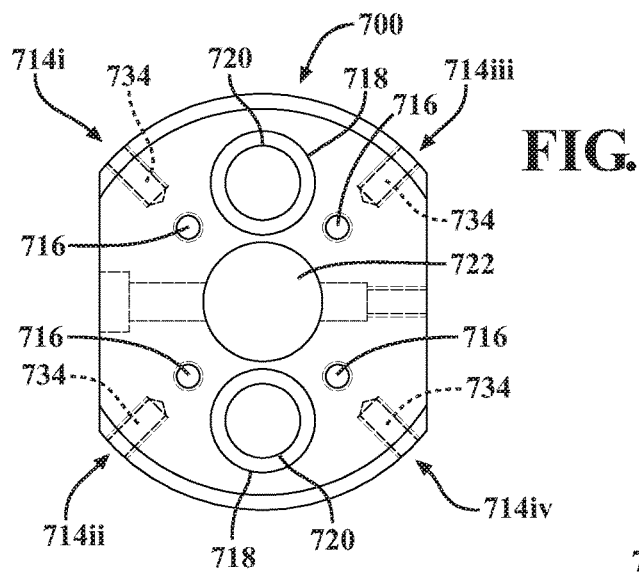
FIG. 13 is a top, plan view of a dowel mount of the end effector.
Figure 14:
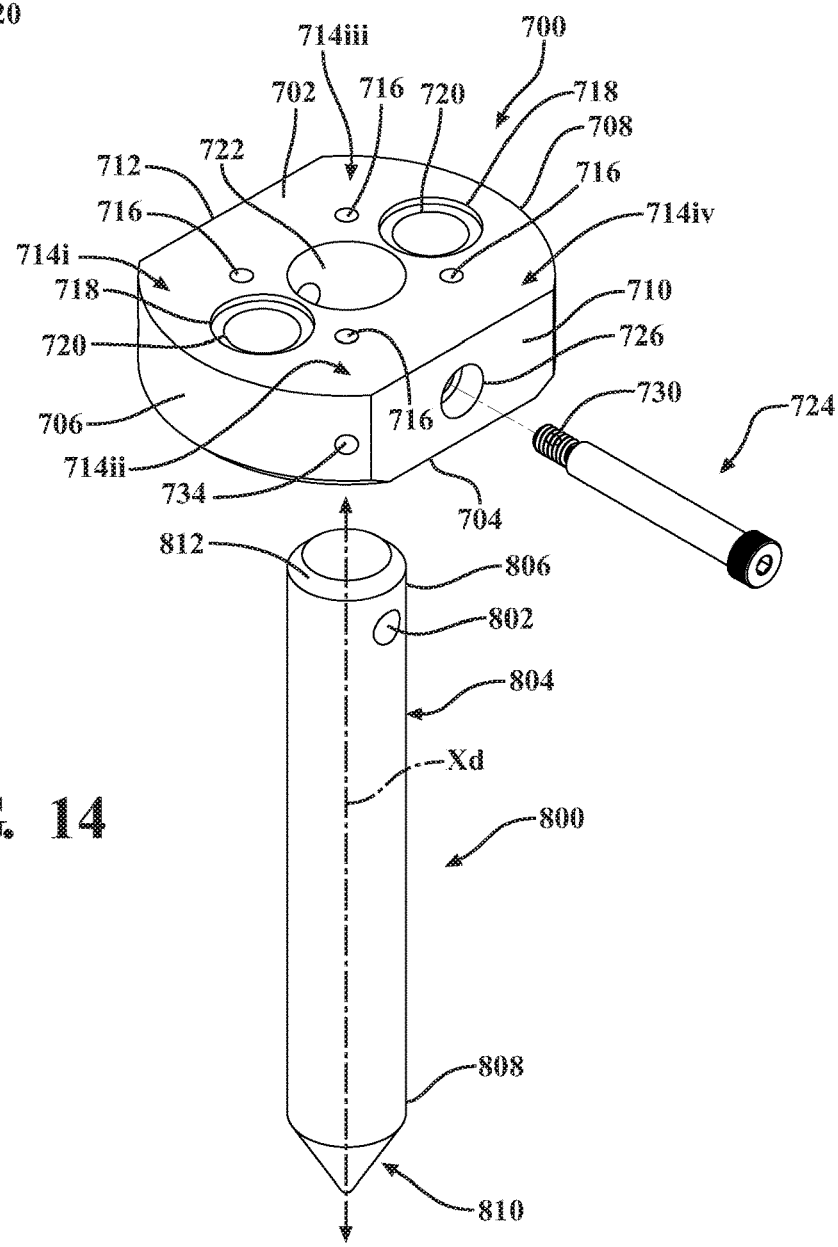
FIG. 14 is a top, perspective view of the dowel mount seen in FIG. 13 shown with a dowel of the end effector.

With reference now to FIGS. 6, 13, and 14 in particular, the dowel mount 700 will be discussed. The dowel mount 700 supports movement (displacement) of the piston shaft(s) 900 and, thus, the interrupter 600, during engagement and disengagement of the end effector 10 and the door D. The dowel mount 700 may include (e.g., may be formed partially or entirely from) any material (or combination of materials) suitable for this intended purpose and may be formed through any suitable method of manufacture (e.g., 3-D printing, machining, casting, etc.). In the embodiment seen throughout the figures, for example, the dowel mount 700 includes (e.g., is formed partially or entirely from) aluminum. It should be appreciated, however, that other materials of construction may be utilized without departing from the scope of the present disclosure.

The dowel mount 700 defines an overall contour that corresponds to that of the base plate 300 and, in the illustrated embodiment, includes respective proximal (upper) and (distal) lower surfaces 702, 704 that are connected by a pair of arcuate end walls 706, 708 and a pair of sidewalls 710, 712 so as to define corner sections 714*i*-714*iv*. To reduce the presence of corners, and thereby simplify cleaning of the end effector 10 as well as assembly and disassembly (e.g., during maintenance and/or part replacement), one or more edges (interfaces) defined by the surfaces 702, 704, the end walls 706, 708, and the sidewalls 710, 712 may be radiused, as seen throughout the figures. In the particular embodiment of the dowel mount 700 illustrated, the respective upper and lower surfaces 702, 704 and the sidewalls 710, 712 are each generally planar in configuration. It is envisioned that the generally planar configuration of the surfaces 702, 704 and the end walls 710, 712 may facilitate manufacture (machining) of the dowel mount 700 by providing flat surfaces in which the various apertures (described below) are formed.

The dowel mount 700 is positioned adjacent to (e.g., in contact with) the distal surface 328 of the base plate 300 and includes a first series of apertures 716 that are in registration (alignment) with the apertures 318*iii* in the base plate 300 such that the fasteners 320*iii* extend through the base plate 300 into the apertures 716 in the dowel mount 700 to thereby connect the dowel mount 700 to the base plate 300. The dowel mount 700 further includes one or more openings 718 that are in registration with the opening(s) 322 formed in the base plate 300. The openings 718 are configured to receive the bearing(s) 1100 and, thus, the piston shaft(s) 900, to allow for vertical movement (displacement) of the piston shaft(s) 900 relative to (and through) the dowel mount 700 and the base plate 300 during use of the end effector 10, as described in further detail below. To facilitate secured reception of the bearing(s) 1100 by the dowel mount 700, and prevent the bearing(s) 1100 from exiting the dowel mount 700 through the distal surface 704 thereof, as discussed above in connection with the base plate 300, the opening(s) 718 may include an inwardly extending projection (shoulder) 720 that is configured for contact (engagement) with distal (lower) end(s) 1104 of the bearing(s) 1100.

In certain embodiments of the disclosure, such as that seen throughout the figures, the dowel mount 700 further includes an opening 722 in registration (alignment) with the receptacle 326 formed in the distal surface 328 of the base plate 300 (and the magnet 330 positioned within the receptacle 326). The opening 722 receives the dowel 800 such that the dowel 800 extends into the dowel mount 700, thereby facilitating contact between the dowel 800 and the magnet 330 to increase the retaining force when the end effector 10 is inactive and reduce (if not entirely eliminate) a false indication of positive engagement with the door D, as mentioned above. Although the dowel 800 is shown as being generally flush (e.g., coextensive) with the proximal surface 702 of the dowel mount 700 throughout the figures, it should be appreciated that the dowel 800 may extend above or below the proximal surface 702 of the dowel mount 700 in alternate embodiments without departing from the scope of the present disclosure, and that the (vertical) position (and or dimensions) of the magnet 330 may be varied accordingly.

To (removably) connect the dowel 800 to the dowel mount 700, and thereby inhibit (if not entirely prevent) relative movement therebetween, in certain embodiments, such as that seen throughout the figures, the end effector 10 may include a fastener 724 (e.g., a screw) that extends through a first aperture 726 in the sidewall 710, through the dowel 800 via an aperture 802, and into a second aperture 728 in the sidewall 712 to thereby connect the dowel 800 to the dowel mount 700 and fix the position of the dowel 800. In the particular embodiment illustrated, the fastener 724 includes a threaded end 730 that is configured for engagement with corresponding threading 732 in the aperture 728.

To facilitate (removable) connection of the dowel mount to the distal cover 1400, the dowel mount 700 further includes one or more apertures 734 that are configured to receive fasteners 736 (e.g., screws), as described in further detail below. Although shown as being positioned adjacent to the interfaces between the end walls 706, 708 and the sidewalls 710, 712 (e.g., in the corner sections 714i-714iv of the dowel mount 700) in the illustrated embodiment, it is envisioned that the particular location of the aperture(s) 734 may be varied without departing from the scope of the present disclosure.

Referring now to FIGS. 1 and 14 in particular, the dowel 800 is configured for insertion into the window channel C such that the end effector 10 is securely engaged with the door D, which allows for manipulation (e.g., opening and closure) of the door D via the robotic unit 1. The dowel 800 may include (e.g., may be formed partially or entirely from) any material (or combination of materials) suitable for this intended purpose and may be formed through any suitable method of manufacture (e.g., 3-D printing, machining, casting, etc.). In the embodiment seen throughout the figures, for example, the dowel 800 includes (e.g., is formed partially or entirely from) a non-electrostatic material, such as, for example, polylactic acid plastic (PLA), so as not to interfere with the application of paint to the vehicle V. It should be appreciated, however, that other materials of construction may be utilized without departing from the scope of the present disclosure. Although shown as being unitary (e.g., monolithic) in construction throughout the figures, embodiments in which the dowel 800 may include a series of discrete components would not be beyond the scope of the present disclosure.

The dowel 800 extends along a longitudinal axis Xd and includes a shaft 804 having respective proximal (upper) and distal (lower) ends 806, 808, and a tip portion 810 located adjacent to the distal end 808 of the shaft 804. The proximal end 806 of the shaft 804 is configured for insertion into the opening 722 in the dowel mount 700 and includes the aforementioned aperture 802, which extends transversely (e.g., orthogonally) in relation to the longitudinal axis Xd of the dowel 800. To facilitate connection of the dowel 800 and the dowel mount 700 (e.g., insertion of the dowel 800 into the opening 722 in the dowel mount 700), in certain embodiments, such as that seen throughout the figures, the proximal end 806 of the dowel 800 may include a chamfer 812.

As seen throughout the figures, the tip portion 810 of the dowel 800 includes a frusto-conical configuration that tapers inwardly to define an apex 814. Upon engagement of the dowel 800 with the door D of the vehicle V, and insertion of the tip portion 810 into the window channel C, the frusto-conical configuration of the tip portion 810 allows for relative movement between the door D and the dowel 800 during manipulation of the door D by the end effector 10. More specifically, as the end effector 10 moves towards and away from the vehicle V during opening and closure of the door D, the door D pivots about the dowel 800, whereby the longitudinal axis Xd (FIG. 14) defined by the dowel 800 also defines an axis of relative rotation between the end effector 10 and the door D. As the door D pivots about the dowel 800, secured engagement between the door D and the end effector 10 is preserved via contact between the window channel C and the tip portion 810 of the dowel 800.

It is also envisioned that frusto-conical configuration of the tip portion 810 may allow for lateral movement (displacement) (e.g., sliding) of the dowel 800 within the window channel C during opening and closure of the door D, which may not only allow for additional range of motion, but may reduce stresses applied to the robotic unit 1 (FIG. 1). The frusto-conical configuration of the tip portion 810 may thus allow for not only relative rotational movement (displacement) between the end effector 10 and the door D, but relative linear movement (displacement) as well.

The inward taper defined by the frusto-conical configuration of the tip portion 810 promotes repeatable and predictable positive engagement with the vehicle door D by guiding the tip portion 810 into proper positioning within the window channel C when compared to known end effectors, which are often generally paddle-shaped members that are generally linear (planar) in configuration. The repeatable and predictable placement facilitated by the configuration of the end effector 10 reduces (if not entirely eliminates) halts during operation that may otherwise be caused by misplacement and false indications of detection and/or engagement, thus reducing the overall time required for task completion and the associated costs.

Figure 5:
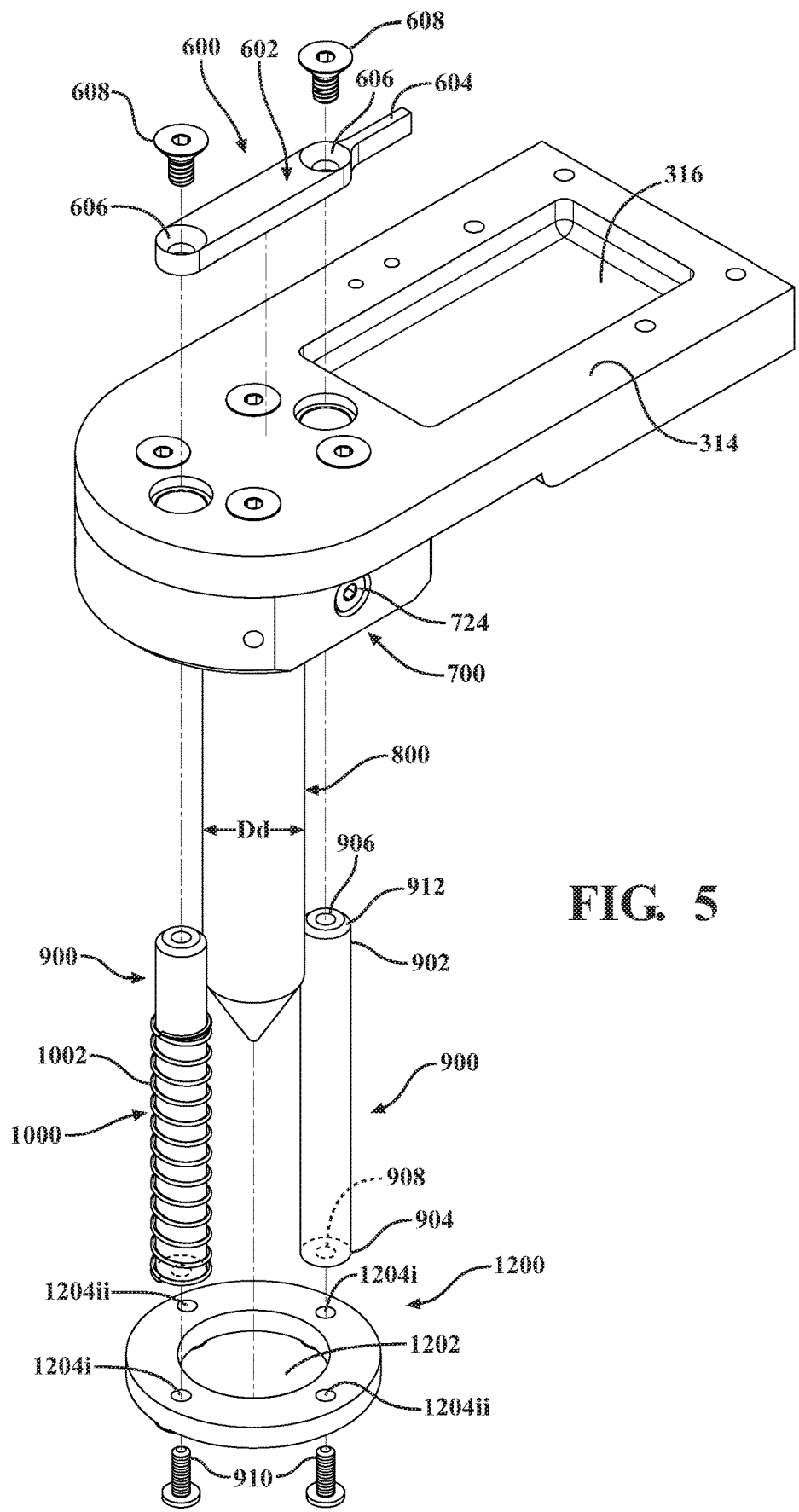
FIG. 5 is a partial, top, perspective view of the end effector with parts separated.

With reference now to FIGS. 4 and 5, the piston shaft(s) 900 will be discussed. The piston shaft(s) 900 support controlled, linear movement (displacement) of the piston 1300 and, thus, the interrupter 600, during use of the end effector 10, as described in further detail below. More specifically, the piston 1300 is vertically movable (in the proximal and distal directions) along an axis Xm (FIG. 4) that extends in generally parallel relation to the longitudinal axis Xd (FIG. 14) defined by the dowel 800 and in generally orthogonal relation to the signal S (FIG. 7) communicated, generated, or otherwise transmitted across the sensor 500. The piston shaft(s) 900 may include (e.g., may be formed partially or entirely from) any material (or combination of materials) suitable for this intended purpose and may be formed through any suitable method of manufacture (e.g., 3-D printing, machining, casting, etc.). In the embodiment seen throughout the figures, for example, the piston shaft(s) 900 include (e.g., are formed partially or entirely from) aluminum and are unitary (e.g., monolithic) in construction. It should be appreciated, however, that other materials of construction may be utilized without departing from the scope of the present disclosure.

In the particular embodiment seen throughout the figures, the end effector 10 includes two piston shafts 900 that are separated by approximately 180°. It is envisioned, however, that the particular number of piston shafts 900, and/or the precise location(s) of the piston shaft(s) 900, may be varied without departing from the scope of the present disclosure. As such, embodiments of the end effector 10 including greater and fewer numbers of piston shafts 900 are envisioned herein, as are embodiments in which the spacing between the piston shaft(s) 900 may be increased or decreased.

Each piston shaft 900 is identical in configuration and is configuration for coaxial reception by a corresponding biasing member 1000 (e.g., a spring 1002) such that the biasing member(s) 1000 are supported by the piston shaft(s) 900 between the piston mount 1200 and the dowel mount 700 to thereby bias the end effector 10 towards the passive configuration (FIG. 3A) and, thus, bias the interrupter 600 towards the first position. Although shown as including a single biasing member 1000 in the embodiment of the end effector 10 seen throughout the figures, it should be appreciated that one or more biasing member(s) 1000 may be included without departing from the scope of the present disclosure.

In certain implementations, it is envisioned that the biasing member(s) 1000 may be configured to exert a biasing force when the end effector 10 is in the passive configuration (e.g., prior to engagement with the door D of the vehicle V), and that such biasing force may either replace or supplement the retention force applied by the magnet 330 (FIG. 9) to reduce (if not entirely eliminate) inadvertent movement of the piston 1300 and, thus, the likelihood that the end effector 10 may falsely identify positive engagement with the door D.

Each piston shaft 900 is generally cylindrical (tubular) in configuration and includes respective proximal and distal ends 902, 904. The proximal end 902 of each piston shaft 900 defines an aperture 906 that is configured to (removably) receive one of the fasteners 608 extending through the interrupter 600 to secure the interrupter 600 to the piston shaft(s) 900 such that movement (displacement) of the piston shaft(s) 900 causes corresponding movement (displacement) of the interrupter 600, as described in further detail below. The distal end 904 of each piston shaft 900 defines an aperture 908 that is configured to (removably) receive a fastener 910 so as to secure the distal end 904 of each piston shaft 900 to the piston mount 1200, as described in further detail below.

The piston shaft(s) 900 extend distally from the interrupter 600 thorough the base plate 300 and the dowel mount 700 via the bearing(s) 1100. To facilitate insertion of the piston shaft(s) 900 through the dowel mount 700, the bearing(s) 1100, and base plate 300 and, thus, connection of the piston shaft(s) 900 to the interrupter 600, in certain embodiments, such as that seen throughout the figures, the proximal end 902 of each piston shaft 900 may include a chamfer 912.

With reference now to FIGS. 6 and 9 as well, the bearing(s) 1100 are retained (and concealed) within the openings 322, 718 in the base plate 300 and the dowel mount 700, and are supported by the projections 324, 720, respectively. The bearing(s) 1100 facilitate smooth, linear motion of the piston 1300 and the piston shaft(s) 900 during use of the end effector 10 and may be configured in any manner suitable for this intended purpose. More specifically, each bearing 1100 defines an axial through-bore 1106 that is configured to receive a corresponding piston shaft 900, which facilitates not only controlled, linear motion of the piston shaft(s) 900, but proper location (positioning) of the piston shaft(s) 900 (e.g., relative to the base plate 300 and the dowel mount 700). Thus, in the particular embodiment seen throughout the figures, the end effector 10 includes two bearings 1100. As indicated above, however, embodiments of the disclosure are envisioned in which the number of piston shafts 900 may be varied. As such, embodiments of the disclosure are envisioned in which the number of bearings 1100 may also be varied.

It is envisioned that the bearing(s) 1100 may include (e.g., may be formed partially or entirely from) any material (or combination of materials) suitable for the intended purpose of facilitating linear motion of the piston shaft(s) 900 in the manner described herein. In the particular embodiment seen throughout the figures, for example, the bearing(s) 1100 include (e.g., are formed partially or entirely from) one or more ceramic materials, thereby reducing (if not entirely eliminating) the need for any lubricant (e.g., oil, silicone, etc.). Embodiments of the bearing(s) 1100 including alternate materials, however, would not be beyond the scope of the present disclosure.

With reference again to FIGS. 4 and 5, the piston mount 1200 supports the distal end 904 of each piston shaft 900 within the piston 1300 and may include (e.g., may be formed partially or entirely from) any material (or combination of materials) suitable for this intended purpose. In the embodiment seen throughout the figures, for example, the piston mount 1200 includes (e.g., is formed partially or entirely from) aluminum. It should be appreciated, however, that other materials of construction may be utilized without departing from the scope of the present disclosure and that the piston mount 1200 may be formed through any suitable method of manufacture (e.g., 3-D printing, machining, casting, etc.).

The piston mount 1200 is configured for positioning within an internal cavity 1302 defined by the piston 1300 and is generally annular in configuration. More specifically, the piston mount 1200 defines an opening 1202 that is configured to receive the dowel 800 such that the piston mount 1200 is vertically movable (in the proximal and distal directions) about the dowel during movement (displacement) of the piston shaft(s) 900 and the piston 1300. The piston mount 1200 includes a series of apertures 1204 that are configured to receive corresponding fasteners to thereby connect the piston mount 1200 to the piston shaft(s) 900 and the piston 1300. More specifically, the piston mount 1200 includes a first pair of apertures 1204i and a second pair of apertures 1204ii. The apertures 1204i are configured to receive the fastener(s) 910, which extend into the distal end 904 of each piston shaft 900, to thereby (removably) connect the piston mount 1200 to the piston shaft(s) 900, as indicated above. Thus, in the particular embodiment seen throughout the figures, the piston mount 1200 includes two apertures 1204i that are separated by approximately 180°. As indicated above, however, embodiments of the disclosure are envisioned in which the number of piston shafts 900 and/or the positions of the piston shaft(s) 900 may be varied. As such, embodiments of the disclosure are envisioned in which the number of apertures 1204i and/or the positions of the aperture(s) 1204i may also be varied.

The apertures 1204ii are configured to receive fasteners 1206, which extend through the piston 1300, so as to (removably) connect the piston 1300 to the piston mount 1200, and, thus, (indirectly) connect the piston 1300 to the piston shaft(s) 900 such that movement (displacement) of the piston 1300 causes corresponding movement (displacement) of the piston mount 1200 and the piston shaft(s) 900 and, thus, the interrupter 600, as described in further detail below. Embodiments of the disclosure are also contemplated herein, however, in which the piston 1300 may be directly connected to the piston shaft(s) 900 via insertion of the fasteners 1206 into the distal end 904 of each piston shaft 900.

In the particular embodiment seen throughout the figures, the piston mount 1200 includes two apertures 1204ii that are separated by approximately 180°. Embodiments of the disclosure are envisioned, however, in which the number of apertures 1204ii (and, thus, the number of fasteners 1206) and/or the positions of the apertures 1204ii may be varied.

With reference now to FIGS. 1-5, 11, and 12, the piston 1300 is operatively connected to the interrupter 600 via the piston shaft(s) 900 (and the piston mount 1200), whereby linear movement (displacement) of the piston 1300 causes corresponding linear movement (displacement) of the piston mount 1200, the piston shaft(s) 900, and the interrupter 600, as described in further detail below. The piston 1300 is configured for contact (engagement) with the inner surface Di (FIG. 1) of the door D of the vehicle V adjacent to the window channel C so as to transmit an axial (vertical) force to the interrupter 600 through the piston mount 1200 and the piston shaft(s) 900 to vary the position of the interrupter 600 in the manner described herein during use of the end effector 10. The piston 1300 may include any material (or combination of materials) suitable for this intended purpose and may be formed through any suitable method of manufacture (e.g., 3-D printing, machining, casting, etc.). In the particular embodiment of the disclosure seen throughout the figures, the piston 1300 includes (e.g., is formed partially or entirely from) a non-electrostatic material, such as, for example, polylactic acid plastic (PLA), so as not to interfere with the application of paint to the vehicle V. Although shown as being unitary (e.g., monolithic) in construction throughout the figures, embodiments in which the piston 1300 may include a series of discrete components would not be beyond the scope of the present disclosure.

The piston 1300 includes an upper body portion 1304 defining the aforementioned internal cavity 1302 (FIG. 4) as well as a sleeve 1306 and a pad 1308, each of which extends distally from the upper body portion 1304. The upper body portion 1304 includes apertures 1310 that are configured in registration with the apertures 1204ii in the piston mount 1200 such that the fasteners 1206 extend through the piston 1300 into engagement with the piston mount 1200 to thereby (removably) connect the piston 1300 to the piston mount 1200, and, thus, indirectly connect the piston 1300 to the piston shaft(s) 900 and the interrupter 600. As indicated above, in the particular embodiment seen throughout the figures, the piston mount 1200 includes two apertures 1204ii that are separated by approximately 180°. Correspondingly, the piston 1300 includes two apertures 1310 that are also separated by approximately 180°. However, as also indicated above, embodiments of the disclosure are envisioned in which the number of apertures 1204ii and/or the positions of the apertures 1204ii may be varied. As such, embodiments of the disclosure are envisioned in which the number of apertures 1310 and/or the positions of the apertures 1310 may also be varied.

The sleeve 1306 extends from the upper body portion 1304 of the piston 1300 to a distal (terminal) end 1312 and defines a central longitudinal axis Xs that is generally aligned with a central longitudinal axis Xp of the piston 1300. The sleeve 1306 defines a through-bore 1314 that is configured to receive the dowel 800 such that the dowel 800 extends distally beyond (vertically below) the piston 1300 in a manner allowing for axial movement (displacement) of the piston 1300 in relation to (and about) the dowel 800, as described in further detail below. The sleeve 1306 is generally cylindrical (tubular) in configuration, which allows the sleeve 1306 to entirely circumscribe the dowel 800 so as to eliminate any spacing (gapping) between the dowel 800 and the sleeve 1306. The elimination of any spacing between the dowel 800 and the sleeve 1306 inhibits (if not entirely prevents) the positioning (e.g., wedging) of any material (e.g., sheet metal on the vehicle V) between the pad 1308 and the sleeve 1306, thus guarding against malfunction of the end effector 10 and increasing the overall efficiency of operation.

The through-bore 1314 defines an inner transverse cross-sectional dimension (diameter) Ds (FIG. 12) that is greater than a maximum outer transverse cross-sectional dimension (diameter) Dd (FIG. 5) defined by the dowel 800 to allow for insertion of the dowel 800 into the sleeve 1306 and relative movement (displacement) between the piston 1300 and the dowel 800. To increase stability and reduce (if not entirely eliminate) relative lateral movement (displacement) (e.g., shaking, rattling, etc.) between the piston 1300 and the dowel 800, however, it is envisioned that the inner transverse cross-sectional dimension (diameter) De of the through-bore 1314 may closely approximate the maximum outer transverse cross-sectional dimension (diameter) Dd defined by the dowel 800. For example, in certain embodiments, it is envisioned that the inner transverse cross-sectional dimension (diameter) Ds defined by the through-bore 1314 may exceed the maximum outer transverse cross-sectional dimension (diameter) Dd defined by the dowel 800 by approximately 2% to approximately 10% (or less).

The pad 1308 extends distally from the upper body portion 1304 and radially outward from the sleeve 1306 and includes an outer wall 1316; a pair of sidewalls 1318, 1320; and a (distal) contact surface 1322 that extends between the outer wall 1316 and the sidewalls 1318, 1320. The pad 1308 is formed integrally with the sleeve 1306, which eliminates any spacing (gapping) therebetween so as to inhibit (if not entirely prevent) the positioning of any material (e.g., sheet metal on the vehicle V) between the pad 1308 and the sleeve 1306, again guarding against malfunction of the end effector 10 and increasing the overall efficiency of operation.

Figure 11:
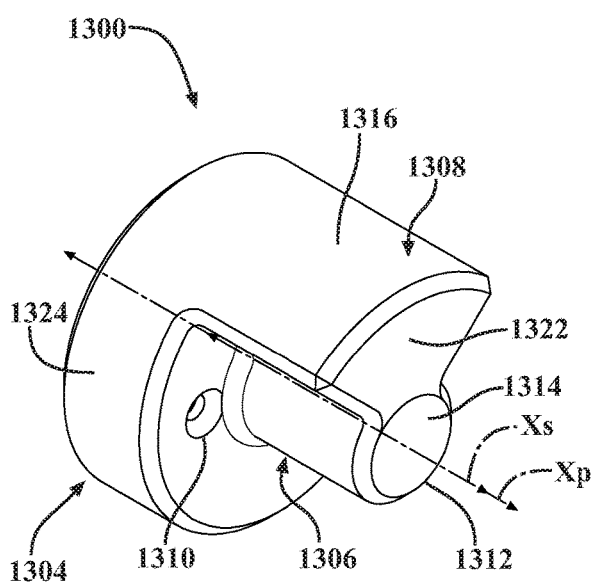
FIG. 11 is a side, perspective view of a piston of the end effector.
Figure 12:
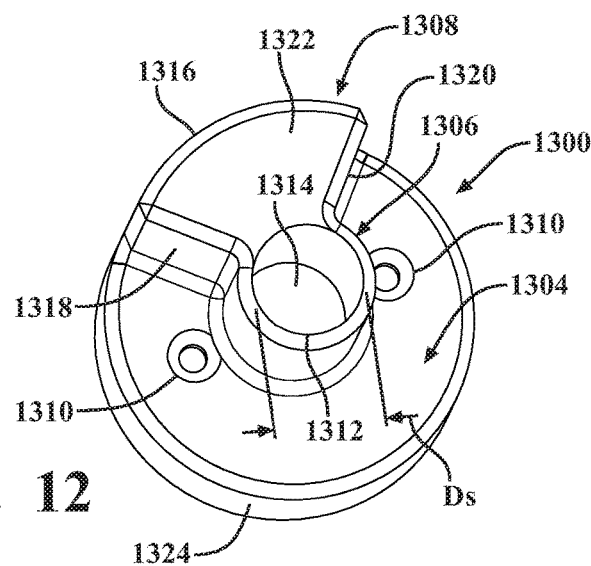
FIG. 12 is a bottom, perspective view of the piston seen in FIG. 11.

The outer wall 1316 of the pad 1308 is arcuate in configuration and is coextensive with an outer wall 1324 defined by the upper body portion 1304 of the pad 1308, which attributes a generally uniform (smooth) outer contour to the piston 1300 that is devoid of any surface irregularities or interruptions. More specifically, as seen in FIGS. 11 and 12, for example, the outer wall 1316 defines an arc that spans a portion of the overall circumference of the piston 1300. The reduced cross-sectional area of the pad 1308 (compared to the cross-sectional area of the upper body portion 1304) restricts contact between the piston 1300 and the door D of the vehicle V to the (non-visible) inner surface Di (FIG. 1) to reduce (if not eliminate) imperfections in the door paint. Additionally, the generally "pie-shaped" configuration of the pad 1308 defined by the outer wall 1316 and the sidewalls 1318, 1320 allows for relative rotational movement (displacement) (e.g., pivoting) between the end effector 10 and the door D during painting while maintaining engagement between the dowel 800 and the window channel C, and, thus, detection of the door D, as discussed below. In the particular embodiment of the disclosure seen throughout the figures, for example, the outer wall 1316 of the pad 1308 defines an arc that spans approximately 90°. The geometry of the piston 1300 thus allows the end effector 10 to rotate (pivot) approximately 120° about the dowel 800 while the dowel 800 is positioned within the window channel C to thereby maintain engagement between the end effector 10 and the door D during such movement. It should be appreciated, however, that the configuration of the pad 1308 may be increased or decreased in alternate embodiments of the piston 1300 to vary the span of the outer wall 1316, and, thus, the effective range of motion of the end effector 10, without departing from the scope of the present disclosure (e.g., depending upon the particular model or style of the vehicle V being painted).

The sidewalls 1318, 1320 of the pad 1308 extend from the outer wall 1316 to the sleeve 1306 and are generally planar in configuration. In the illustrated embodiment, the interfaces defined at the intersections of the sidewalls 1318, 1320 with the outer wall 1316 and the sleeve 1306 are radiused, which reduces the presence of corners, again simplifying cleaning of the end effector 10 as well as assembly and disassembly (e.g., during maintenance and/or part replacement). The sidewalls 1318, 1320 are positioned such that the apertures 1310 formed in the upper body portion 1304 of the piston 1300 are located between the sidewalls 1318, 1320 so as not to interfere with insertion of the fasteners 1206 through the piston 1300.

The contact surface 1322 defined by the pad 1308 extends between the outer wall 1316 and the sidewalls 1318, 1320 to the sleeve 1306 so as to connect the outer wall 1316, the sidewalls 1318, 1320, and the sleeve 1306. In the illustrated embodiment, the interfaces defined at the intersections of the sidewalls 1318, 1320 with the contact surface 1322 are radiused to further reduce the presence of corners, again simplifying cleaning of the end effector 10 as well as assembly and disassembly (e.g., during maintenance and/or part replacement). The contact surface 1322 is generally coextensive with the distal end 1312 of the sleeve 1306 and is configured for contact with the non-visible, inner surfaces Di of the door D (e.g., those surfaces positioned inwardly of the window channel C), as described above and elaborated upon below. More specifically, the contact surface 1322 is generally planar in configuration and extends in generally orthogonal relation to the longitudinal axes Xp, Xs respectively defined by the piston 1300 and the sleeve 1306.

Figures 3A, 3B:
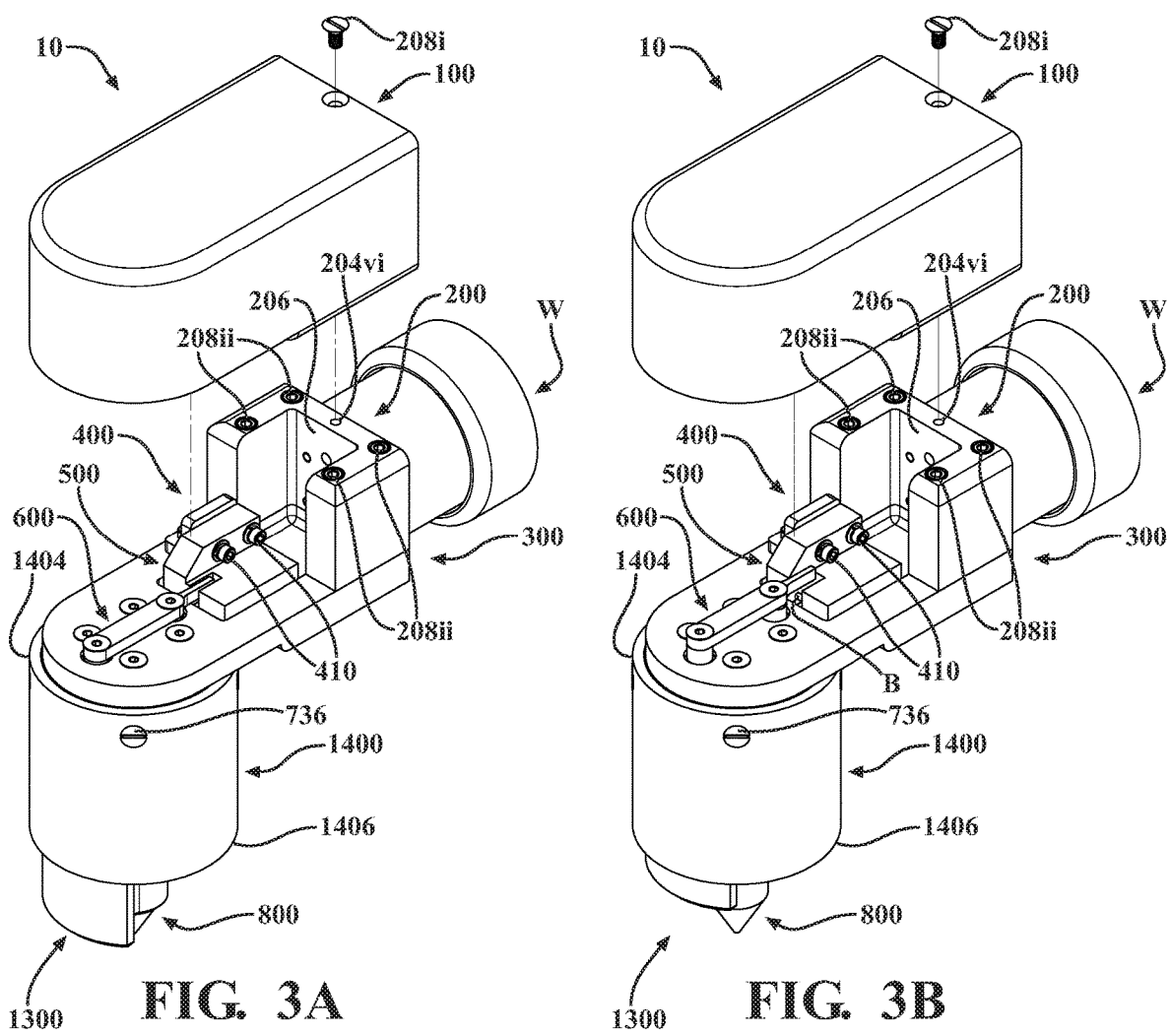
FIG. 3A is a side, perspective view of the end effector prior to engagement with the vehicle door shown with a proximal (upper) cover removed.
FIG. 3B is a side, perspective view of the end effector upon positive engagement with the vehicle door shown with the proximal (upper) cover removed.

With reference now to FIGS. 3A, 3B, and 4, the distal cover 1400 will be discussed. The distal cover 1400 is positioned about the dowel mount 700, the piston shaft(s) 900, the biasing member(s) 1000, and the upper body portion 1304 of the piston 1300 to conceal and protect the movable components of the end effector 10 (e.g., the piston 1300, the piston mount 1200, the piston shaft(s) 900, and the biasing member(s) 1000) from paint overspray. The distal cover 1400 is unitary (e.g., monolithic) in construction and may include any material (or combination of materials) suitable for this intended purpose. In the particular embodiment of the disclosure seen throughout the figures, the piston 1300 includes (e.g., is formed partially or entirely from) a non-electrostatic material, such as, for example, polylactic acid plastic (PLA), so as not to interfere with the application of paint to the vehicle V. It should be appreciated, however, that the particular material(s) used in construction of the distal cover 1400 may be varied in alternate embodiments without departing from the scope of the present disclosure and that the distal cover 1400 may be formed through any suitable method of manufacture (e.g., 3-D printing, machining, casting, etc.).

The distal cover 1400 is generally cylindrical (tubular) in configuration and defines a through-bore 1402 that is configured to receive the piston 1300. More specifically, the through-bore 1402 defines an inner transverse cross-sectional dimension (diameter) Dc greater than a maximum outer transverse cross-sectional dimension (diameter) Dp defined by the piston 1300 to allow for relative (vertical) movement (displacement) of the piston 1300 through the distal cover 1400. To increase stability and reduce (if not entirely eliminate) relative lateral movement (e.g., shaking, rattling, etc.) between the piston 1300 and the distal cover 1400, however, it is envisioned that the inner transverse cross-sectional dimension (diameter) Dc of the through-bore 1402 extending through the distal cover 1400 may closely approximate the maximum outer transverse cross-sectional dimension (diameter) Dp defined by the piston 1300. For example, in certain embodiments, it is envisioned that the inner transverse cross-sectional dimension (diameter) Dc may exceed the maximum outer transverse cross-sectional dimension (diameter) Dp by approximately 2% to approximately 10% (or less).

The distal cover 1400 includes respective proximal and distal ends 1404, 1406. The proximal end 1404 includes a series of apertures 1408 that are positioned in registration (alignment) with the apertures 736 in the dowel mount 700 and configured to receive the fasteners 736 to allow for removable connection of the distal cover 1400 to the dowel mount 700. While the dowel mount 700 and the distal cover 1400 are each illustrated as including four apertures 736, 1408, respectively, it should be appreciated that the particular number of apertures 736, 1408 respectively included on the dowel mount 700 and the distal cover 1400 may be varied in alternate embodiments without departing from the scope of the present disclosure.

With reference now to FIGS. 1-14, use and operation of the end effector 10 will be discussed in connection with the robotic unit 1. Initially, the robotic unit 1 is positioned such that the end effector 10 is located in proximity to the door D vertically above with the window channel C. More specifically, the end effector 10 is positioned such that the pad 1308 of the piston 1300 is vertically aligned with the inner surface Di of the door D and the dowel 800 is vertically aligned with the window channel C. The end effector 10 is then lowered into contact with the door D, whereby the contact surface 1322 (FIGS. 11, 12) of the pad 1308 is brought into contact (engagement) with the inner surface Di and the tip portion 810 of the dowel 800 is inserted into the window channel C.

As the dowel 800 is advanced distally (vertically downward) into the window channel C, contact between the pad 1308 and the inner surface Di causes proximal (vertically upward) displacement (movement) of the piston 1300 (against the bias applied by the biasing member(s) 1000) along the axis of movement Xm (FIG. 4), thereby transitioning the end effector 10 from the passive configuration (FIG. 3A) into the active configuration (FIG. 3B). Due to the connections between the piston 1300, the piston mount 1200, and the piston shaft(s) 900 established by the fasteners 1206, 910, proximal displacement (movement) of the piston 1300 causes corresponding proximal displacement (movement) of the piston shaft(s) 900 and compression of the biasing member(s) 1000 between the piston mount 1200 and the dowel mount 700. Proximal displacement (movement) of the piston shaft(s) 900, in turn, causes corresponding proximal displacement (movement) of the interrupter 600 from the first position (FIG. 3A) to the second position (FIG. 3B) by virtue of the connection between the interrupter 600 and the piston shaft(s) 900 established by the fastener(s) 608.

During movement (displacement) of the interrupter 600 into the second position, the flag 604 is removed from the gap 502 (FIG. 7) defined by the sensor 500, which allows for transmission of the signal S across the sensor 500 and, thus, circuit completion to thereby confirm not only presence of the door D, but positive engagement of the door D by the end effector 10, for the robotic unit 1. The interrupter 600 thus provides an interface between the piston 1300 and the sensor 500 to convert the position and movement (displacement) of the piston 1300 into a (fiber optic) indication of positive engagement between the end effector 10 and the door D (or the lack thereof).

Following circuit completion, the robotic unit 1 can proceed with opening and closure of the door D in accordance with its normal sequence of operation via engagement with the end effector 10 (e.g., as regulated by a controller (not shown)).

After painting of the vehicle V by an additional robotic unit (not shown) (e.g., through the open door D), the end effector 10 can be disengaged from the door D by withdrawing the dowel 800 from the window channel C. As the dowel 800 is withdrawn from the window channel C, the biasing member(s) 1000 expand and urge the piston mount 1200 and, thus, the piston shaft(s) 900, distally (vertically downward) to thereby restore the passive configuration (FIG. 3A) of the end effector 10 by transitioning the end effector 10 from the active configuration (FIG. 3B). Distal movement (displacement) of the piston shaft(s) 900 causes reinsertion of the flag 604 into the gap 502 (FIG. 7) defined by the sensor 500 as the interrupter 600 is returned to the first position (FIG. 3A) as well as distal (vertically downward) movement (displacement) of the piston 1300. The aforedescribed sequence of operation can then be repeated to open and close additional doors D on the vehicle V to allow for additional painting of the vehicle V as necessary.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An end effector configured for connection to a robotic unit used to manipulate a door of a vehicle, the end effector comprising:
   a base plate;
   a sensor supported by the base plate;
   a piston configured for engagement with the door, the piston being operatively connected to an interrupter such that movement of the piston causes corresponding movement of the interrupter between a first position, in which the interrupter is aligned with a signal transmitted across the sensor to interfere with the signal and thereby interrupt circuit completion, and a second position, in which the interrupter is out of alignment with the signal transmitted across the sensor to permit circuit completion and thereby inform the robotic unit that the door is present and engaged with the end effector; and
   a dowel configured for insertion into a window channel of the door.

2. The end effector of claim 1, wherein the end effector includes a non-electrostatic material.

3. The end effector of claim 1, wherein the end effector is configured for connection to fiber optic transmission media such that the signal transmitted across the sensor is a fiber optic signal.

4. The end effector of claim 1, wherein the piston is indirectly connected to the interrupter.

5. The end effector of claim 1, further including a biasing member configured to bias the interrupter towards the first position.

6. The end effector of claim 1, wherein the piston is configured for movement along an axis extending in generally orthogonal relation to the signal transmitted across the sensor.

7. The end effector of claim 6, wherein the piston is configured for linear, vertical movement between the first position and the second position.

8. The end effector of claim 1, wherein the dowel extends through the piston such that the dowel extends beyond a contact surface defined by the piston configured for contact with the door.

9. The end effector of claim 8, wherein the piston defines a sleeve configured to receive the dowel such that the sleeve circumscribes the dowel.

10. The end effector of claim 8, wherein the piston includes an outer wall defining an arc spanning approximately 90° to allow for relative rotation between the dowel and the door while maintaining engagement between the dowel and the door.

11. The end effector of claim 8, further including a dowel mount configured to secure the dowel in relation to the base plate.

12. The end effector of claim 11, further including a bearing received by the dowel mount, the bearing configured to support movement of the piston as the interrupter moves between the first position and the second position.

13. An end effector configured for connection to a robotic unit used to manipulate a door of a vehicle, the end effector comprising:
 a fixed member configured for insertion into a window channel defined by the door; and
 a movable member configured for contact with the door and positioned about the fixed member such that the end effector is reconfigurable between a passive configuration, in which signal transmission across the end effector is obstructed to prevent circuit completion, and an active configuration, in which signal transmission across the end effector is unobstructed to allow for circuit completion to thereby inform the robotic unit that the door is present and engaged with the end effector, wherein the movable member is operatively connected to an interrupter such that reconfiguration of the end effector causes corresponding repositioning of the interrupter to thereby obstruct and allow for circuit completion.

14. The end effector of claim 13, wherein the interrupter is aligned with a fiber optic beam transmitted across the end effector when the end effector is in the passive configuration and misaligned with the fiber optic beam when the end effector is in the active configuration.

15. The end effector of claim 14, wherein the end effector is biased towards the passive configuration.

16. The end effector of claim 14, wherein the movable member is configured for movement along an axis extending in generally orthogonal relation to the fiber optic beam.

17. The end effector of claim 13, wherein the movable member defines a sleeve configured to receive the fixed member such that the sleeve circumscribes the fixed member, the movable member including an outer wall defining an arc spanning approximately 90° to allow for relative rotation between the end effector and the door while maintaining engagement between the fixed member and the door.

18. An end effector configured for connection to a robotic unit used to manipulate a door of a vehicle, the end effector comprising:
 an interrupter movable between a first position, in which the robotic unit is informed that the door has not been engaged by the end effector, and a second position, in which presence of the door and engagement of the door by the end effector is confirmed for the robotic unit;
 a piston shaft secured to the interrupter;
 a piston configured for contact with the door and operatively connected to the interrupter via the piston shaft such that linear movement of the piston shaft causes corresponding linear movement of the interrupter;
 a dowel configured for insertion into a window channel of the door; and
 a biasing member supported by the piston shaft such that the interrupter is biased towards the first position.

19. The end effector of claim 18, wherein the piston includes:
 a body portion; and
 a pad extending from the body portion, the body portion defining a first cross-sectional area and the pad defining a second cross-sectional area less than the first cross-sectional area so as to restrict contact between the piston and the door and reduce imperfections during painting of the door.

20. The end effector of claim 19, wherein the pad includes an arcuate outer wall coextensive with an outer wall of the body portion, whereby the piston includes a generally uniform outer contour.

\* \* \* \* \*